(12) United States Patent
Strandemar et al.

(10) Patent No.: US 10,044,946 B2
(45) Date of Patent: Aug. 7, 2018

(54) FACILITATING ANALYSIS AND INTERPRETATION OF ASSOCIATED VISIBLE LIGHT AND INFRARED (IR) IMAGE INFORMATION

(71) Applicant: FLIR Systems AB, Täby (SE)

(72) Inventors: Katrin Strandemar, Rimbo (SE); Björn Roth, Hägersten (SE); Mats Ahlström, Sollentuna (SE)

(73) Assignee: FLIR SYSTEMS AB, Taby (SE)

( * ) Notice: Subject to any disclaimer, the term of this patent is extended or adjusted under 35 U.S.C. 154(b) by 601 days.

(21) Appl. No.: 14/503,332

(22) Filed: Sep. 30, 2014

(65) Prior Publication Data

US 2015/0109454 A1 Apr. 23, 2015

Related U.S. Application Data

(63) Continuation-in-part of application No. PCT/EP2013/056708, filed on Mar. 28, 2013, and a
(Continued)

(51) Int. Cl.
*H04N 5/32* (2006.01)
*H04N 5/232* (2006.01)
(Continued)

(52) U.S. Cl.
CPC ............. *H04N 5/332* (2013.01); *G06T 5/50* (2013.01); *H04N 5/2628* (2013.01);
(Continued)

(58) Field of Classification Search
CPC ...... H04N 5/332; H04N 5/23296; G06T 5/50; G06T 2207/10048; G06T 2207/20221
(Continued)

(56) References Cited

U.S. PATENT DOCUMENTS

| 4,661,986 A | 4/1987 | Adelson |
| 5,140,416 A | 8/1992 | Tinkler |
| (Continued) | | |

FOREIGN PATENT DOCUMENTS

| CN | 101111748 | 1/2008 |
| CN | 101226635 | 7/2008 |
| (Continued) | | |

OTHER PUBLICATIONS

Hao et al., "An Infrared Image Fusion Algorithm Based on Lifting Wavelet Transform", Laser & Infrared, Jan. 31, 2009, vol. 39, No. 1, pp. 97-100.
(Continued)

*Primary Examiner* — Andy Rao
*Assistant Examiner* — Zaihan Jiang
(74) *Attorney, Agent, or Firm* — Haynes and Boone, LLP

(57) ABSTRACT

There is provided for an embodiment a method for enabling improved analysis and interpretation of associated image data in an infrared (IR) image and a visible light (VL) image depicting a real world scene, captured using a thermography arrangement comprising an IR imaging system and a VL imaging system, the method comprising: capturing an IR image depicting the scene, having a first field of view (FOV); capturing a VL image depicting the scene, having a second FOV; processing at least one of the VL image and the IR image such that the FOV represented in the VL image substantially corresponds to the FOV represented in the IR image; associating the resulting IR and VL images to provide associated images; and enabling a user to access the associated images for display, wherein analysis and interpretation of the associated images, having image pair content, is intuitive as the resulting VL image and the resulting IR image after associating represent the same FOV.

20 Claims, 9 Drawing Sheets

Related U.S. Application Data continuation-in-part of application No. 13/437,645, filed on Apr. 2, 2012, now Pat. No. 9,171,361, which is a continuation-in-part of application No. 12/766,739, filed on Apr. 23, 2010, now Pat. No. 8,520,970, and a continuation-in-part of application No. 13/105,765, filed on May 11, 2011, now Pat. No. 8,565,547, which is a continuation of application No. PCT/EP2011/056432, filed on Apr. 21, 2011, and a continuation-in-part of application No. 12/766,739, filed on Apr. 23, 2010, now Pat. No. 8,520,970, said application No. PCT/EP2011/056432 is a continuation-in-part of application No. 12/766,739, filed on Apr. 23, 2010, now Pat. No. 8,520,970, application No. 14/503,332, which is a continuation-in-part of application No. 14/138,040, filed on Dec. 21, 2013, now Pat. No. 9,451,183, and a continuation-in-part of application No. 14/138,052, filed on Dec. 21, 2013, now Pat. No. 9,635,285, and a continuation-in-part of application No. 14/138,058, filed on Dec. 21, 2013, and a continuation-in-part of application No. 14/299,987, filed on Jun. 9, 2014, now Pat. No. 9,083,897, which is a continuation of application No. 12/477,828, filed on Jun. 3, 2009, now Pat. No. 8,749,635.

(60) Provisional application No. 61/618,001, filed on Mar. 30, 2012, provisional application No. 61/473,207, filed on Apr. 8, 2011, provisional application No. 61/792,582, filed on Mar. 15, 2013, provisional application No. 61/746,069, filed on Dec. 26, 2012, provisional application No. 61/793,952, filed on Mar. 15, 2013, provisional application No. 61/746,074, filed on Dec. 26, 2012, provisional application No. 61/748,018, filed on Dec. 31, 2012.

(51) Int. Cl.
*G06T 5/50* (2006.01)
*H04N 5/33* (2006.01)
*H04N 5/262* (2006.01)
*H04N 5/272* (2006.01)

(52) U.S. Cl.
CPC ... *H04N 5/272* (2013.01); *G06T 2207/10048* (2013.01); *G06T 2207/20221* (2013.01)

(58) Field of Classification Search
USPC .......................................................... 348/164
See application file for complete search history.

(56) References Cited

U.S. PATENT DOCUMENTS

| | | | |
|---|---|---|---|
| 5,488,674 A | 1/1996 | Burt et al. | |
| 5,555,324 A | 9/1996 | Waxman et al. | |
| 7,199,366 B2 | 4/2007 | Hahn et al. | |
| 7,620,265 B1 | 11/2009 | Wolff | |
| 7,876,973 B2 | 1/2011 | Fairbanks et al. | |
| 8,520,970 B2 | 8/2013 | Strandemar | |
| 8,565,547 B2 | 10/2013 | Strandemar | |
| 2002/0015536 A1 | 2/2002 | Warren et al. | |
| 2006/0056735 A1* | 3/2006 | De Haan | G06T 3/4084 382/299 |
| 2006/0088298 A1 | 4/2006 | Frame et al. | |
| 2006/0249679 A1* | 11/2006 | Johnson | G01C 3/08 250/332 |
| 2006/0289772 A1 | 12/2006 | Johnson et al. | |
| 2007/0018919 A1 | 1/2007 | Zavracky et al. | |
| 2007/0102622 A1* | 5/2007 | Olsen | G02B 7/04 250/208.1 |
| 2007/0177819 A1 | 8/2007 | Ma et al. | |
| 2007/0183657 A1 | 8/2007 | Kidono et al. | |
| 2007/0235634 A1 | 10/2007 | Ottney et al. | |
| 2008/0099678 A1* | 5/2008 | Johnson | G01J 5/02 250/332 |
| 2008/0239091 A1 | 10/2008 | Soga | |
| 2009/0002475 A1 | 1/2009 | Jelley et al. | |
| 2009/0310815 A1* | 12/2009 | Chiakpo | G06T 1/20 382/100 |
| 2010/0262017 A1* | 10/2010 | Frangioni | A61B 1/0005 600/476 |
| 2011/0063451 A1 | 3/2011 | Kamon et al. | |
| 2011/0262053 A1 | 10/2011 | Strandemar | |

FOREIGN PATENT DOCUMENTS

| | | |
|---|---|---|
| CN | 101404084 | 4/2009 |
| EP | 0973137 | 1/2000 |
| EP | 1811771 | 7/2007 |
| GB | 2442512 | 4/2008 |
| JP | 2007184805 | 7/2007 |
| KR | 20050103194 | 10/2005 |
| WO | WO 01/82593 | 11/2001 |
| WO | WO 2004/070449 | 8/2004 |
| WO | WO 2009/008778 | 1/2009 |
| WO | WO 2011/131758 | 10/2011 |
| WO | WO2012/027739 | 3/2012 |

OTHER PUBLICATIONS

Yan Jixiang, "Infrared Image Sequence Enhancement Based on Wavelet Transform", Full-Text Database of China Excellent Master Degree Thesis, Information Technology Collection, Jan. 15, 2009, No. 01, pp. 1-69.
Gangkofner, Ute G., et al., "Optimizing the High-Pass Filter Addition Technique for Image Fusion," Photogrammetric Engineering & Remote Sensing, vol. 74, No. 9, Sep. 1, 2008, pp. 1107-1118.
Ager, Thomas P., et al., "Geo-positional Accuracy Evaluation of QuickBird Ortho-Ready Standard 2A Multispectral Imagery," Algorithms and Technologies for Multispectral, Hyperspectral, and Ultraspectral Imagery X, vol. 5425, Aug. 12, 2004, pp. 488-499.
Toshihiro, Horie, Alpha Blending Tutorial, http:--www.ocf.berkeley.edu-~horie-alphablend.html, Jan. 21, 2002, 4 pages.
Alpha Compositing, http:--en.wikipedia.org-wiki-Alpha_compositing, printed Feb. 4, 2010, 4 pages.
Sony, XIS-5400 XIS-5310 XIS-CM543 XIS-SR500, Wide Area Monitoring Solutions, Brochure published by Sony Corporation, 2008, 8 pages.
Fluke, New! Fluke Ti25 and Ti10 Thermal Imagers, Brochure published by Fluke Corporations, 2008, 5 pages.

\* cited by examiner

FACILITATING ANALYSIS AND INTERPRETATION OF ASSOCIATED VISIBLE LIGHT AND INFRARED (IR) IMAGE INFORMATION

CROSS-REFERENCE TO RELATED APPLICATIONS

This patent application is a continuation-in part of International Patent Application No. PCT/EP2013/056708 filed Mar. 28, 2013 and entitled "FACILITATING ANALYSIS AND INTERPRETATION OF ASSOCIATED VISIBLE LIGHT AND INFRARED (IR) IMAGE INFORMATION" which is hereby incorporated by reference in its entirety.

International Patent Application No. PCT/EP2013/056708 claims the benefit of U.S. Provisional Patent Application No. 61/618,001 filed Mar. 30, 2012 and entitled "FACILITATING ANALYSIS AND INTERPRETATION OF ASSOCIATED VISIBLE LIGHT AND INFRARED (IR) IMAGE INFORMATION" which is hereby incorporated by reference in its entirety.

This patent application is also a continuation-in-part of U.S. patent application Ser. No. 13/437,645 filed Apr. 2, 2012 and entitled "INFRARED RESOLUTION AND CONTRAST ENHANCEMENT WITH FUSION" which is hereby incorporated by reference in its entirety.

U.S. patent application Ser. No. 13/437,645 is a continuation-in-part of U.S. patent application Ser. No. 12/766,739 filed Apr. 23, 2010 and entitled "INFRARED RESOLUTION AND CONTRAST ENHANCEMENT WITH FUSION" which is hereby incorporated by reference in its entirety.

U.S. patent application Ser. No. 13/437,645 also claims the benefit of U.S. Provisional Patent Application No. 61/473,207 filed Apr. 8, 2011 and entitled "INFRARED RESOLUTION AND CONTRAST ENHANCEMENT WITH FUSION" which is hereby incorporated by reference in its entirety.

U.S. patent application Ser. No. 13/437,645 is also a continuation-in-part of U.S. patent application Ser. No. 13/105,765 filed May 11, 2011 and entitled "INFRARED RESOLUTION AND CONTRAST ENHANCEMENT WITH FUSION" which is hereby incorporated by reference in its entirety.

U.S. patent application Ser. No. 13/105,765 is a continuation of International Patent Application No. PCT/EP2011/056432 filed Apr. 21, 2011 and entitled "INFRARED RESOLUTION AND CONTRAST ENHANCEMENT WITH FUSION" which is hereby incorporated by reference in its entirety.

U.S. patent application Ser. No. 13/105,765 is also a continuation-in-part of U.S. patent application Ser. No. 12/766,739 which is hereby incorporated by reference in its entirety.

International Patent Application No. PCT/EP2011/056432 is a continuation-in-part of U.S. patent application Ser. No. 12/766,739 which is hereby incorporated by reference in its entirety.

International Patent Application No. PCT/EP2011/056432 also claims the benefit of U.S. Provisional Patent Application No. 61/473,207 which is hereby incorporated by reference in its entirety.

This patent application is also a continuation-in-part of U.S. patent application Ser. No. 14/138,040 filed Dec. 21, 2013 and entitled "TIME SPACED INFRARED IMAGE ENHANCEMENT" which is hereby incorporated by reference in its entirety.

U.S. patent application Ser. No. 14/138,040 claims the benefit of U.S. Provisional Patent Application No. 61/792,582 filed Mar. 15, 2013 and entitled "TIME SPACED INFRARED IMAGE ENHANCEMENT" which is hereby incorporated by reference in its entirety.

U.S. patent application Ser. No. 14/138,040 also claims the benefit of U.S. Provisional Patent Application No. 61/746,069 filed Dec. 26, 2012 and entitled "TIME SPACED INFRARED IMAGE ENHANCEMENT" which is hereby incorporated by reference in its entirety.

This patent application is a continuation-in-part of U.S. patent application Ser. No. 14/138,052 filed Dec. 21, 2013 and entitled "INFRARED IMAGING ENHANCEMENT WITH FUSION" which is hereby incorporated by reference in its entirety.

U.S. patent application Ser. No. 14/138,052 claims the benefit of U.S. Provisional Patent Application No. 61/793,952 filed Mar. 15, 2013 and entitled "INFRARED IMAGING ENHANCEMENT WITH FUSION" which is hereby incorporated by reference in its entirety.

U.S. patent application Ser. No. 14/138,052 also claims the benefit of U.S. Provisional Patent Application No. 61/746,074 filed Dec. 26, 2012 and entitled "INFRARED IMAGING ENHANCEMENT WITH FUSION" which is hereby incorporated by reference in its entirety.

This patent application is also a continuation-in-part of U.S. patent application Ser. No. 14/138,058 filed Dec. 21, 2013 and entitled "COMPACT MULTI-SPECTRUM IMAGING WITH FUSION" which is hereby incorporated by reference in its entirety.

U.S. patent application Ser. No. 14/138,058 claims the benefit of U.S. Provisional Patent Application No. 61/748,018 filed Dec. 31, 2012 and entitled "COMPACT MULTI-SPECTRUM IMAGING WITH FUSION" which is hereby incorporated by reference in its entirety.

This patent application is a continuation-in-part of U.S. patent application Ser. No. 14/299,987 filed Jun. 9, 2014 and entitled "INFRARED CAMERA SYSTEMS AND METHODS FOR DUAL SENSOR APPLICATIONS" which is hereby incorporated by reference in its entirety.

U.S. patent application Ser. No. 14/299,987 is a continuation of U.S. patent application Ser. No. 12/477,828 filed Jun. 3, 2009 and entitled "INFRARED CAMERA SYSTEMS AND METHODS FOR DUAL SENSOR APPLICATIONS" which is hereby incorporated by reference in its entirety.

TECHNICAL FIELD

Generally, embodiments of the invention relate to the technical field of thermographic imaging. More specifically, different embodiments of the application relates to facilitating or enabling improved analysis and interpretation of associated visible light or visual light (VL) image and infrared (IR) image information.

BACKGROUND

Many thermography arrangements today comprise a combination of a visible light imaging system and an infrared (IR) imaging system. Since it is often hard to interpret an IR image and relate it to what is shown in a corresponding visible light (VL) image, there also exist suggestions on how analysis and interpretation of captured visible light and IR image data may be enabled. Some prior art references disclose blending or fusion of IR image data and visible light image data with the purpose of enabling easier analysis and interpretation of a depicted scene.

In prior art methods for fusion a visible light image may be scaled to match an IR image, and further aligned with the IR image, with the purpose of fusing the images into a combined image, comprising both visible light image data and IR image data. A combined image may be stored along with the captured IR and visible light images, the separate images being stored in their original captured format, thereby enabling later retrieval of the original images comprising all captured data.

However, many users of thermography systems do not use all advanced software features available in the thermography system, such as for example the possibility to combine VL image and IR image data to fuse visible light and IR image data. Instead, a user may simply use the thermography arrangement to capture image data during an extended period of time, for example an hour or a day, perhaps store the captured images and thereafter, at site or possibly at a later time, display or retrieve the images from memory for analysis. If the user sees something of interest in an IR image, for example indicating a temperature anomaly or an interesting pattern, the user may turn to a corresponding visible light image for more information on what part of the scene the interesting IR feature relates to. However, as the VL image might depict or represent a different captured view of the real world scene than the captured view of the real world scene of the IR image it is difficult for the user to relate the visible light image information to the IR image information. In addition, the interpretation of a combined IR/VL image is difficult when the VL image might depict or represent a different captured view of the real world scene than the captured view of the real world scene of the IR image.

Therefore, there still exists a need for facilitating or enabling improved analysis and interpretation of associated visible light and IR image information when the visible light image information and the IR image information are not combined into one image, for example visual light (VL) only or IR only, and when the visible light image information and the IR image information are combined into one image, for example using picture in picture, blending or fusing methods.

SUMMARY

Systems and methods are disclosed, in accordance with one or more embodiments, which are directed to providing improved analysis and interpretation of associated visible light and IR image information when the visible light image information and the IR image information are not combined into one image.

One or more embodiments may facilitate or enable improved analysis and interpretation of associated visible light and IR image information when the visible light image information and the IR image information are or are not combined into one image, for example using picture in picture, blending or fusing methods. Furthermore, one or more embodiments may facilitate or enable improved analysis and interpretation of an image pair comprising an infrared (IR) image and a visible light image depicting a real world scene, said images being captured using a thermography arrangement comprising an IR imaging system and a visible light imaging system.

Since the field of view of the visible light imaging system of the thermography arrangement is typically substantially larger than the field of view of the IR imaging system, the same coordinates in the visible light image and the IR image will not represent the same part of the scene, which makes it difficult for a user to relate the visible light image information to the IR image information. Thus, techniques disclosed herein for one or more embodiments may ensure that images or image sequences captured using an infrared (IR) imaging system and a visible light (VL) imaging system, respectively, are displayed and/or stored in a format wherein the images have the same the field of view (FOV). As discussed further herein, this is also referred to as FOV follow functionality, or FOV follow mode.

By ensuring that the FOV of images, or image frame sequences, represent the same FOV, or in other words depict the same part of the observed scene, a comparison between images is facilitated. For instance, if an image pair comprising an IR image and a VL image depicting the same scene further depict the scene according to the same FOV, it will be easier for a user to compare what is seen in one of the images to what is seen in the other and thereby come to conclusions in an analysis of the observed scene. According to one or more embodiments described herein, a user friendly way of presenting IR and VL image data is provided, thereby rendering an improved usability and facilitating or enabling improved analysis and interpretation of what is represented in the captured images.

According to an embodiment of the invention, there is provided a method for facilitating or enabling improved analysis and interpretation of associated infrared (IR) and visible light (VL) image data in an IR image and a VL image depicting a real world scene, said images being captured using a thermography arrangement comprising an IR imaging system and a visible light imaging system, the method comprising: associating an IR image and a VL image depicting the real world scene; processing at least one of the VL image and the IR image such that the field of view represented in the VL image substantially corresponds to the field of view represented in the IR image, thereby generating a resulting IR image and a resulting VL image with corresponding fields of view; enabling a user to access the associated images for display of a representation of said associated images.

According to another embodiment of the invention, there is provided a thermography arrangement for facilitating or enabling improved analysis and interpretation of associated infrared (IR) and visible light (VL) image data in an IR image and a VL image depicting a real world scene, said arrangement comprising: an IR imaging system configured to capture an IR image of the real world scene according to a first field of view; a visible light imaging system configured to capture a visible light image according to a second field of view; a processor arranged to process at least one of the visible light image and the IR image such that the field of view represented in the visible light image substantially corresponds to the field of view represented in the IR image and associate the resulting IR and visible light images; and a memory configured to store the associated images.

According to further embodiments, there are provided computer systems, computer-readable media, and/or computer program products configured to perform any of the steps or functions of the method embodiments described herein.

The scope of the invention is defined by the claims, which are incorporated into this Summary by reference. A more complete understanding of embodiments of the invention will be afforded to those skilled in the art, as well as a realization of additional advantages thereof, by a consideration of the following detailed description of one or more embodiments. Reference will be made to the appended sheets of drawings that will first be described briefly.

DETAILED DESCRIPTION

Introduction

Figure 1:
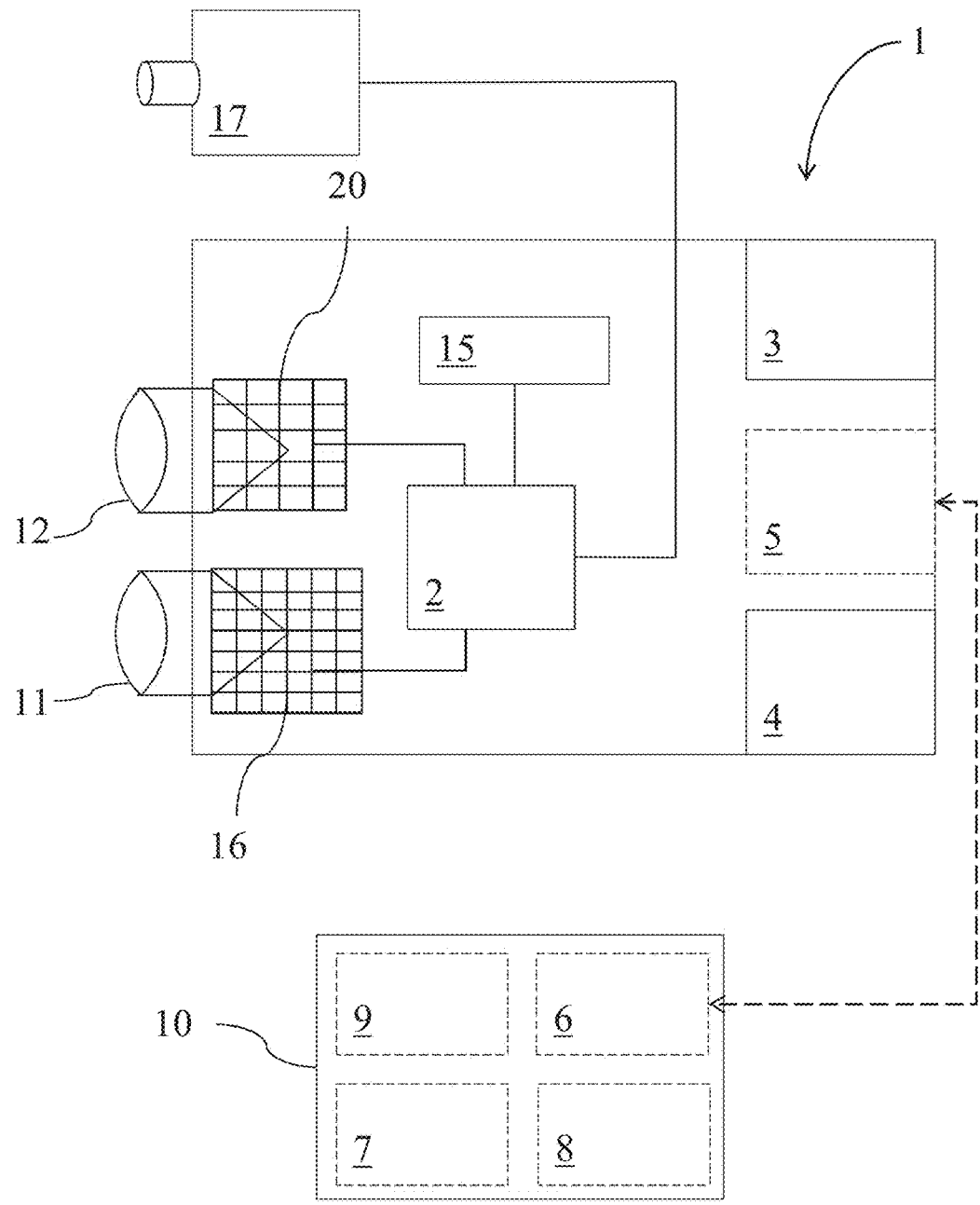
FIG. 1 shows a schematic view of a thermography arrangement according to an embodiment.

In accordance with one or more embodiments, methods described herein may ensure that images or image sequences captured using an infrared (IR) imaging system and a visible light (VL) imaging system, respectively, are displayed and/or or stored in a format wherein the images have the same the field of view (FOV). Herein, this is also referred to as FOV follow functionality.

According to an embodiment, the IR imaging system and the VL imaging system are both comprised in a thermography arrangement, as further described below. According to embodiments presented herein, ensuring that the FOVs are the same comprises zooming and/or shifting the images captured by the imaging system having the wider FOV, in such a way that they match the images captured using the imaging system having the narrower FOV.

By ensuring that the FOV of images, or image frame sequences, represent the same FOV, or in other words depict the same part of the observed scene, a comparison between images is facilitated. For instance, if an image pair comprising an IR image and a VL image depicting the same scene further depict the scene according to the same FOV, it will be easier for a user to compare what is seen in one of the images to what is seen in the other and thereby come to conclusions in an analysis of the observed scene.

Typically, the VL imaging system has a wider FOV than the IR imaging system. Therefore, in many cases it will be the VL FOV that needs to be adapted, e.g. zoomed and/or shifted, to match the FOV of the IR imaging system. VL imaging system may have, for example, a FOV of 50-60 degrees, while an IR imaging system may have, for example, a FOV of 25 degrees. However, according to an embodiment, the thermography arrangement has additional IR optics providing a FOV of e.g., 90 degrees for the IR imaging system. According to this embodiment, the FOV of the IR image is adapted, e.g., zoomed and/or shifted, to match the FOV of the VL image according to any of the embodiments described below.

It is possible, for example, to turn on and turn off the FOV follow functionality of the method embodiments presented herein. Sometimes the user wants to view or store a VL image with a wider FOV than the FOV of the IR imaging system (if this is the narrower FOV of the two). If the FOV follow functionality is turned off, the IR FOV and the VL FOV are per default set to their respective maximum value.

Field of View (FOV)

A VL imaging system commonly has a visible (or visual) field of view (FOV) of approximately 40-70°, while an IR imaging system typically has a narrower visible (or visual) FOV, e.g., of approximately 20-30°. It should be appreciated by one of ordinary skill that other viewing angles may be used, for example through use of replaceable optical elements or lenses including optical elements. For IR imaging devices, replaceable optical elements or lenses including optical elements may for instance render a FOV of 15-45°, or even viewing angles of up to approximately 90°.

System Architecture

FIG. 1 shows a schematic view of an embodiment of a thermography arrangement 1 for facilitating or enabling improved analysis and interpretation of associated infrared (IR) and visible light (VL) image data in an IR image and a VL image depicting a real world scene. According to an embodiment, the thermography arrangement 1 comprises an IR imaging system 12 having an IR sensor 20, the IR imaging system 12 being configured to capture an IR image of the real world scene according to a first field of view. According to an embodiment, the thermography arrangement 1 further comprises a VL imaging system 11 having a visible (or visual) sensor 16, the VL imaging system 11 being configured to capture a visible light image according to a second field of view.

According to embodiments, the thermography arrangement 1 further comprises an optional sensor device aimed at the observed real world scene and communicatively coupled to the thermography arrangement 1.

According to embodiments, the sensor device is one of a laser projector configured to project a laser dot onto observed real world scene, a visual light source configured to project a laser dot onto observed real world scene, a rangefinder configured to project a laser dot onto observed real world scene, an ambient temperature sensor or a humidity sensor.

The IR imaging system 12 comprised in the thermography arrangement 1 is configured to capture IR images and the visible light (VL) imaging system 11 is configured to capture visible light (VL) images, in manners known per se (e.g., in one or more conventional ways as would be understood by one skilled in the art). According to an embodiment, the IR image and the visible light image are captured simultaneously. According to another embodiment, the IR image and the visible light image are captured in close succession. According to a third embodiment, the IR image and the visible light image are captured at time instances further apart.

After capturing of one or more IR and/or VL images, the captured one or more images are transmitted to a processor 2 configured to perform image processing operations.

The processor 2 is according to embodiments integrated in the thermography arrangement 1, coupled to the thermography arrangement 1 or configured to receive data transferred from the thermography arrangement 1. The captured images may also be transmitted with possible intermediate storing to a processing unit separate or external from the imaging device. The processing in the imaging device or the separate processing unit are provided with specifically designed programming or program code portions adapted to control the processing unit or processor to perform the steps and functions of embodiments of the inventive method, as further described herein.

According to an embodiment, the processor 2 is arranged to process at least one of the visible light image and the IR image such that the field of view represented in the visible light image substantially corresponds to the field of view represented in the IR image.

According to an embodiment, the processor 2 is arranged to process at least one of the visible light image and the IR image such that the field of view represented in the visible light image substantially corresponds to the field of view represented in the IR image comprises a selection of the following operations: cropping; windowing; zooming; shifting; and rotation of at least one of the images or parts of at least one of the images.

According to embodiments, the processor 2 is arranged to process at least one of the captured visible light image and the captured IR image such that a processed visible light image and a processed IR image depicts or represents substantially the same subset of the captured view of the real world scene, wherein the subset of the captured view of the real world scene is entirely enclosed by the IR imaging system FOV and the VL imaging system FOV.

Determining Area to Apply FOV Follow Functionality On

Figure 6A:
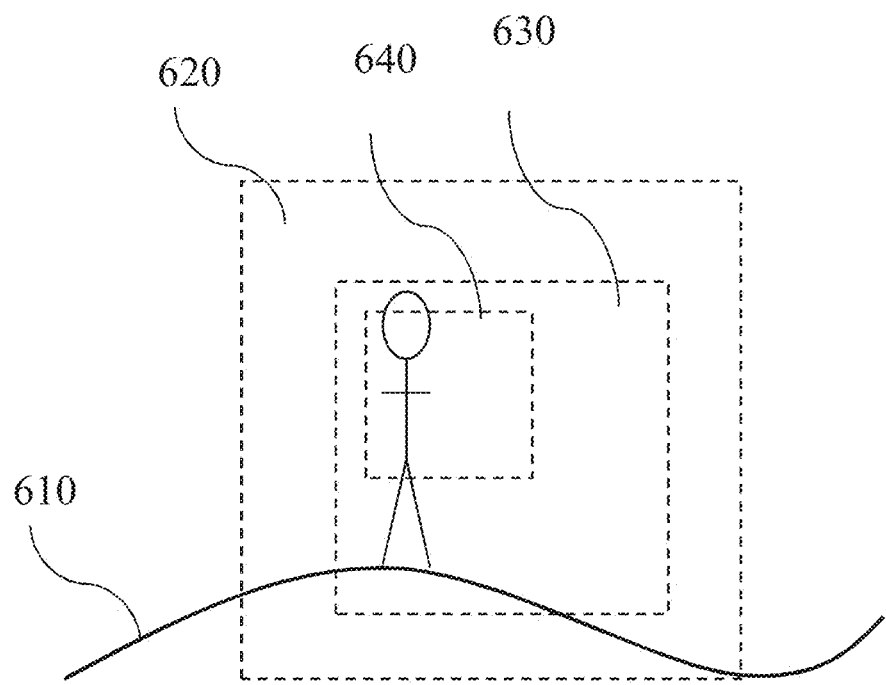
FIG. 6a shows examples of how the captured view without FOV functionality is for the VL imaging system 620 and how the captured view without FOV functionality is for the IR imaging system 630.

FIG. 6a shows examples of how the captured view without FOV functionality is for the VL imaging system 620 and how the captured view without FOV functionality is for the IR imaging system 630. FIG. 6a also shows an exemplary subset 640 of the captured view of the real world scene entirely enclosed by the IR imaging system FOV and the VL imaging system FOV. In addition FIG. 6a shows an observed real world scene 610.

Figure 6B:
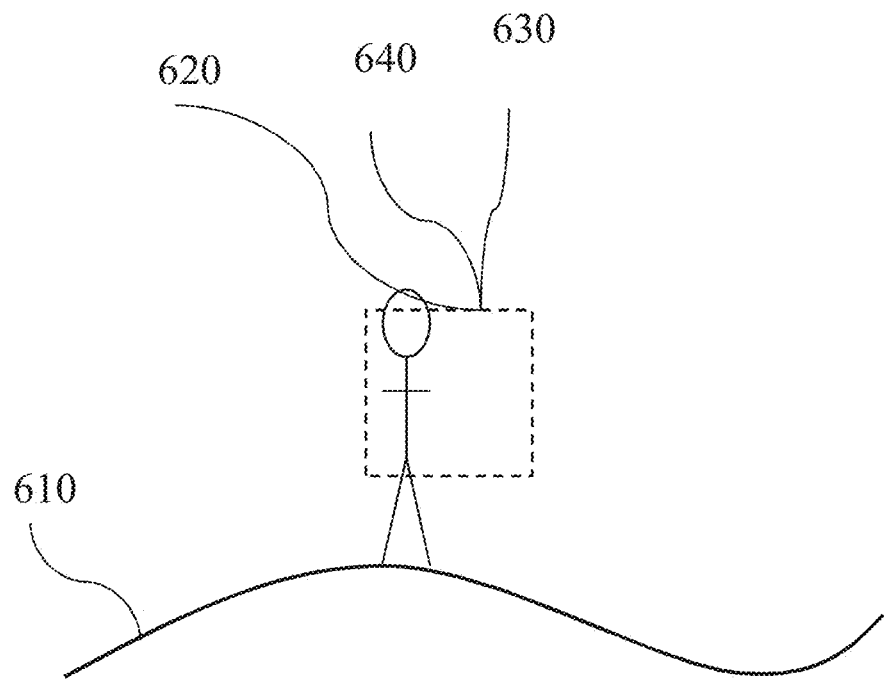
FIG. 6b shows an example how, when FOV functionality is activated, the processed visible light image and the processed IR image depicts or represents substantially the same subset of the captured view

FIG. 6b shows an example how, when FOV functionality is activated, the processed visible light image and the processed IR image depicts or represents substantially the same subset of the captured view According to embodiments, the subset of the captured view of the real world scene is determined by:
  determining the latest image, as which one of the captured visible light image and the captured IR image that is most recently captured
  determining the earliest image, as which one of the captured visible light image and the captured IR image that is not most recently captured
  determining the subset of the captured view of the real world scene as the overlap of the captured view of the real world scene represented by the latest image and the captured view of the real world scene represented by earliest image, thereby obtaining a processed visible light image and a processed IR image depicting or representing the subset of the captured view of the real world scene.

According to embodiments, the subset of the captured view of the real world scene is determined by:
  determining a luminance measure of the captured VL image, indicative of the amount or intensity of visual light.
  determining the subset of the captured view of the real world scene as the captured view of the real world scene represented by the VL image if the determined luminance measure is equal to or above a predetermined threshold and determining the subset of the captured view of the real world scene as the captured view of the real world scene represented by the IR image if the determined luminance measure is below a predetermined threshold, thereby obtaining a processed visible light image and a processed IR image depicting or representing the subset of the captured view of the real world scene.

Figure 8A:
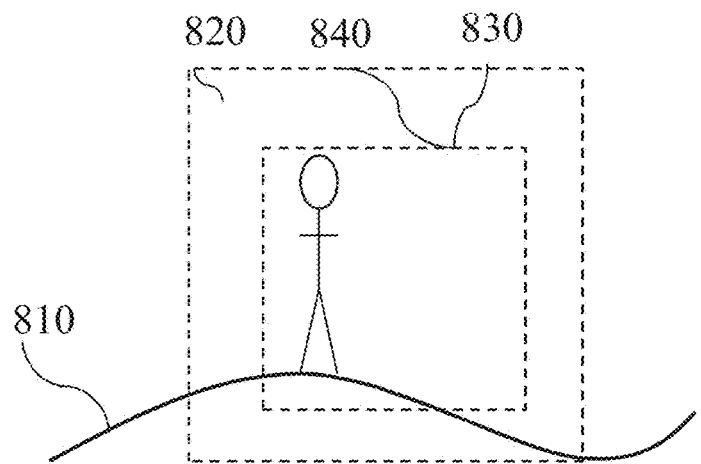
FIG. 8a-8c shows exemplary ways of determining a subset of the captured view of the real world scene based by determining an indicative location in a captured VL image or IR image.
Figure 8B:
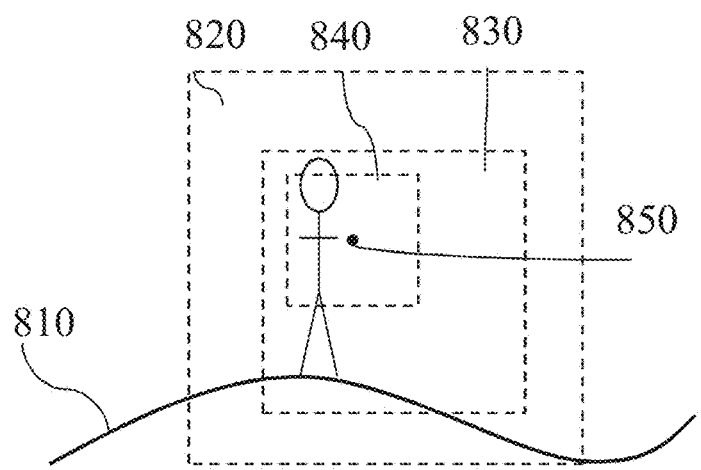
Figure 8C:
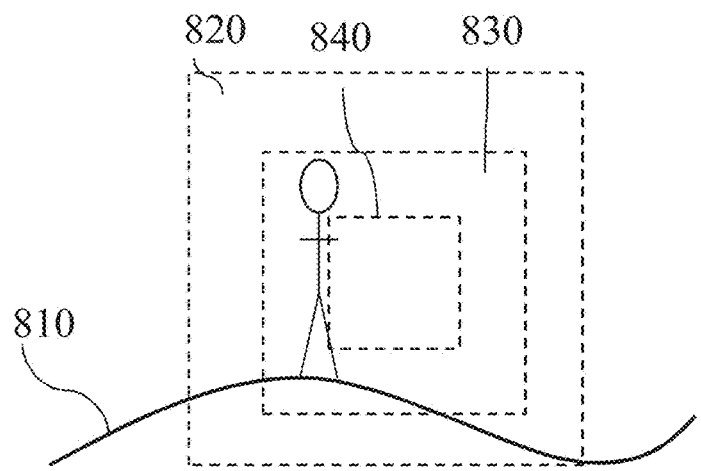

FIG. 8a-8c shows exemplary ways of determining a subset of the captured view of the real world scene based by determining an indicative location in a captured VL image or IR image.

FIG. 8a shows an example where the real world scene 810, the captured view of the real world scene by the VL imaging system 820, the captured view of the real world scene by the IR imaging system 830 and the subset of the captured view of the real world scene 840 is illustrated. In an example the operational mode of FOV follow functionality the captured view of the real world scene by the IR imaging system 830 is entirely enclosed in the captured view of the real world scene by the VL imaging system 820 which is selected as the subset of the captured view of the real world scene 840.

Subset of the Captured View of the Real World Scene

According to embodiments, the subset of the captured view of the real world scene is determined by:
  determining an indicative location in a captured VL image or IR image,
  associating the location with a predetermined feature
  determining the subset of the captured view of the real world scene as the outline of the predetermined feature, thereby obtaining a processed visible light image and a processed IR image depicting or representing the subset of the captured view of the real world scene.

According to embodiments, determining the indicative location in a captured VL image or IR image is performed by:
  projecting a laser dot onto the real world scene by a laser projector attached to or integrated in the thermography arrangement.
  determining the location of the laser dot in a captured VL image or IR image representing or depicting the real world scene as the indicative location
  associate a predetermined feature to the determined indicative location.
  obtaining a processed visible light image and a processed IR image depicting or representing the subset of the captured view of the real world scene by cropping the part of the VL image and the part of the IR image outside the outline of the predetermined feature.

FIG. 8b shows an example where the real world scene 810, the captured view of the real world scene by the VL imaging system 820, the captured view of the real world scene by the IR imaging system 830 and the subset of the captured view of the real world scene 840 is illustrated. In an example an indicative location is indicated by the user by aiming a laser dot 850 by a projector 17 onto the real world scene 810, the location of the laser dot in a captured VL image or IR image is determined as an indicative location, a predetermined feature, such as a rectangle, is associated, e.g. centered on, with the indicative location and the subset of the captured view of the real world scene is determined as the outline of the predetermined feature.

In one exemplary embodiment a laser projector attached to or integrated in the thermography arrangement is projecting a laser dot onto the real world scene, e.g. onto a first object. The location of the laser dot in a captured VL image or IR image representing or depicting the real world scene is determined, e.g. by detecting the laser dot in the VL image or by predetermined relations between the IR imaging system, the VL imaging system and the laser projector, e.g. FOV. A predetermined feature is associated to the determined laser dot location in the VL image and the IR image, e.g. a rectangle centered on the determined location. Determining the subset of the captured view of the real world scene as the outline of the predetermined feature, such as a rectangle, and obtaining a processed visible light image and a processed IR image depicting or representing the subset of the captured view of the real world scene by cropping the part of the VL image and the part of the IR image outside the outline of the predetermined feature.

According to embodiments, determining the indicative location in a captured VL image or IR image is performed by:
  determining the indicative location as the center of the captured IR image or the center of the captured VL image
  associate a predetermined feature to the determined indicative location.
  obtaining a processed visible light image and a processed IR image depicting or representing the subset of the captured view of the real world scene by cropping the part of the VL image and the part of the IR image outside the outline of the predetermined feature.

FIG. 8c shows an example where the real world scene 810, the captured view of the real world scene by the VL imaging system 820, the captured view of the real world scene by the IR imaging system 830 and the subset of the captured view of the real world scene 840 is illustrated. In an example an indicative location is indicated by the user by centering the view of real world scene 810 on to an area of interest, the center of the captured IR image or the center of the captured VL image is determined as an indicative location, a predetermined feature, such as a rectangle, is associated, e.g. centered on, with the indicative location and the subset of the captured view of the real world scene is determined as the outline of the predetermined feature.

In one exemplary embodiment, the center of a captured VL image or the center of a captured IR image representing or depicting the real world scene is determined as the indicative location. A predetermined feature is associated to the indicative location in the VL image and the IR image, e.g. a rectangle centered on the determined location. Determining the subset of the captured view of the real world scene as the outline of the predetermined feature, such as a rectangle, and obtaining a processed visible light image and a processed IR image depicting or representing the subset of the captured view of the real world scene by cropping the part of the VL image and the part of the IR image outside the outline of the predetermined feature.

According to embodiments, determining the indicative location in a captured VL image or IR image is performed by:
  determining the indicative location as the center of an object represented in the captured IR image or the center of an object represented in the captured VL image
  associate a predetermined feature to the determined indicative location.
  obtaining a processed visible light image and a processed IR image depicting or representing the subset of the captured view of the real world scene by cropping the part of the VL image and the part of the IR image outside the outline of the predetermined feature.

According to embodiments, the center of an object is indicated by a user through a user interface.

According to embodiments, the center of an object is indicated by detecting an object in the captured VL image or captured IR image and determining the center of the object.

In one exemplary embodiment, an object is detected in a captured VL image or in a captured IR image, e.g. by user indicating the object or through prior art object detection methods. The center of an object in a captured VL image or the center of an object in a captured IR image representing or depicting the real world scene is determined as the indicative location. A predetermined feature is associated to the indicative location in the VL image and the IR image, e.g. a rectangle centered on the determined location. Determining the subset of the captured view of the real world scene as the outline of the predetermined feature, such as a rectangle, and obtaining a processed visible light image and a processed IR image depicting or representing the subset of the captured view of the real world scene by cropping the part of the VL image and the part of the IR image outside the outline of the predetermined feature.

According to an embodiment, the processor 2 is arranged to perform scaling of the at least one processed image such that the size of the images becomes the same. According to an embodiment, the processor 2 is arranged to perform resampling of the at least one processed image such that the resolution of the images becomes the same.

According to an embodiment, the processor 2 is further configured to associate the resulting IR and visible light images. According to an embodiment, the processor 2 is configured to generate a data structure comprising the associated images, for example in the form of an image pair.

The processor 2 may be a processor such as a general or special purpose processing engine for example a microprocessor, microcontroller or other control logic that comprises sections of code or code portions, stored on a computer readable storage medium, that are fixed to perform certain tasks but also other sections of code, stored on a computer readable storage medium, that can be altered during use. Such alterable sections can comprise parameters that are to be used as input for the various tasks, such as the calibration of the thermography arrangement 1, the sample rate, or the filter for the spatial filtering of the images, among others.

According to an embodiment, the processor 2 is configurable using a hardware description language (HDL).

According to an embodiment, the processor 2 is a field-programmable gate array (FPGA), i.e., an integrated circuit designed to be configured by the customer or designer after manufacturing and configurable using a hardware description language (HDL). For this purpose embodiments of the invention comprise configuration data configured to control an FPGA to perform the steps and functions of the method embodiments described herein.

According to an embodiment, the thermography arrangement 1 further comprises a selection of one or more input devices 4 for inputting commands and/or control signals, e.g., an interactive display, joystick and/or record/push-buttons. In response to input commands and/or control signals, the processor 2 controls functions of the different parts of the thermography arrangement 1.

Figure 5:
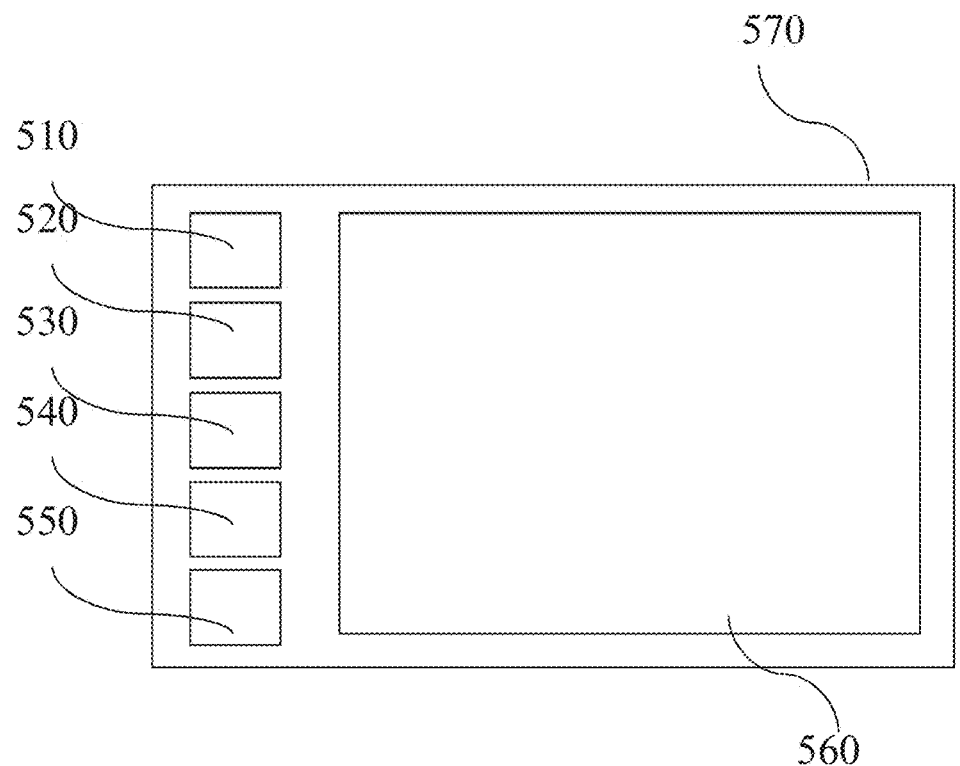
FIG. 5 shows an exemplary embodiment of an input device 4 is shown. The input device comprises an interactive display 570, such as a touch screen, an image display section and controls 510-550 enabling the user to enter input

In FIG. 5 an exemplary embodiment of an input device is shown. The input device comprises an interactive display 570, such as a touch screen, an image display section and controls 510-550 enabling the user to enter input.

Figure 7:
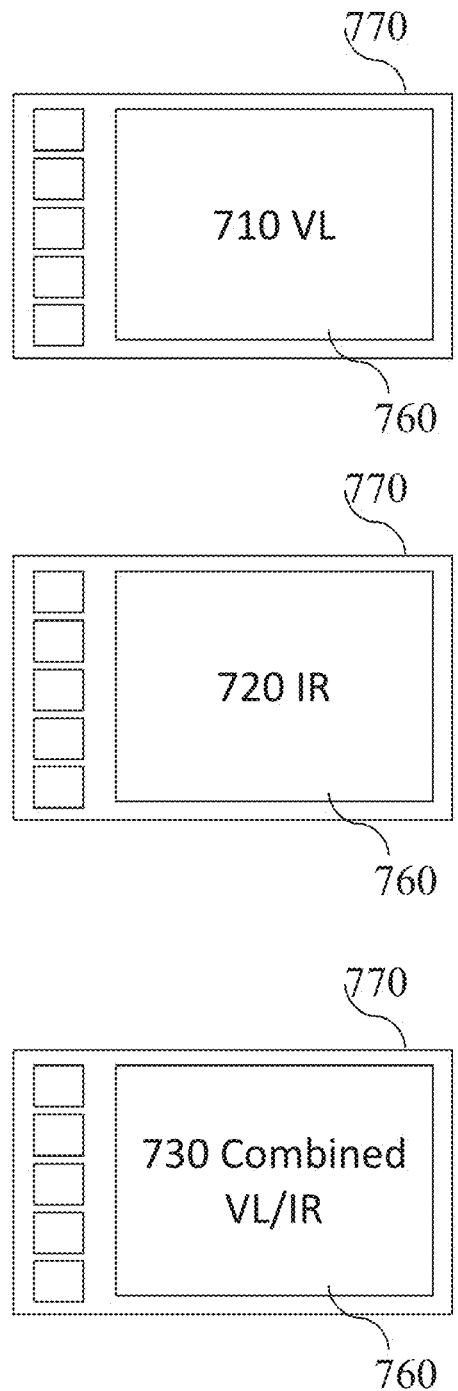
FIG. 7 shows displaying of an image, such as the associated IR image, the associated VL image or a combined image based on the associated IR image and the associated VL image.

According to an embodiment, the input device 4 comprises controls enabling the user to perform the functions of:
- Activate 510 or deactivate the "FOV follow" functionality, i.e. matching of the FOV represented by the associated IR images with the FOV of the associated VL image,
- Selecting to 520 access/or display an image, such as the associated IR image, the associated VL image or a combined image based on the associated IR image and the associated VL image. This is further detailed in FIG. 7.
- Selecting the mode 530 of determining the subset of the captured view of the real world scene depicted or represented by the processed visible light image and the processed IR image when the "FOV follow" functionality is applied, as described above in the section "Determining area to apply FOV follow functionality on"
- Storing or saving images 540 to a memory (8 or 15).
- Performing a zooming or scaling action 550 on either the IR or the VL image According to an embodiment, the thermography arrangement 1 further comprises at least one memory 15 for storing the data registered or processed by the thermography arrangement 1. According to an embodiment, the memory 15 is configured to store the image data, for example the associated images obtained from the processing described above. The memory 15 may be integrated into the thermography arrangement 1 or coupled to the thermography arrangement 1 via wired or wireless communication. According to an embodiment, the memory is an external memory 8 integrated in an external unit 10, the memory 8 being configured to receive and store data from the thermography arrangement 1. According to embodiments, the memory may be a memory 15 that is integrated in or coupled to the thermography arrangement and/or a memory 8 that is integrated in an external unit configured to receive data from, and/or transfer data to, the thermography arrangement 1. According to embodiments, each memory 15, 8 may either be a volatile memory or a non-volatile memory.

According to an embodiment, the thermography arrangement 1 comprises or is coupled to a data communication interface 5 configured to communicate data to an external unit 10 and thereby enable a user to access and/or display the associated images using an external unit 10. According to an embodiment, the external unit 10 comprises a processing unit 9 configured to perform any, all or a selection of the method steps of functions described herein. According to an embodiment, data is transferred or communicated between the thermography arrangement 1 and the external unit 10 via a data communication interface 5 of the thermography arrangement 1 and a corresponding data communication interface 6 of the external unit, the interfaces e.g., comprising wired or wireless connections, IRDA, Bluetooth, USB, Fire-Wire, etc. (e.g., one or more various types of interface standards). The one-way or two-way communication enabled by said interfaces 5, 6 is illustrated by a dashed arrow in FIG. 1.

Furthermore, the thermography arrangement 1 may comprise a display configured to display at least one of the associated IR and VL images or a combined image based on the associated IR and VL images. According to an embodiment, the display is a display 3 integrated in or couplable to the thermography arrangement 1. According to an embodiment, the display is an external display 7 integrated in or coupled to an external unit 10 and configured to receive data transferred from the thermography arrangement via the interfaces 5, 6 described above. The display 3, 7 is configured to display the associated images to the user for further analysis and interpretation. By enabling a user to access the associated images for display, analysis and interpretation of the image content of an associated IR image and VL image pair is intuitive as the VL image and the IR image are representations of the same real world scene according to the same field of view, meaning that a user viewing both images, or switching between the images, can easily and quickly relate the information presented in one image to the information presented in the other.

In this document, the terms "computer program product" and "computer-readable storage medium" may be used generally to refer to media such as a memory 15 or the storage medium of processor 2 or an external storage medium. These and other forms of computer-readable storage media may be used to provide instructions to processor 2 for execution. Such instructions, generally referred to as "computer program code" (which may be grouped in the form of computer programs or other groupings), when executed, enable the thermography arrangement (e.g., IR camera) 1 to perform features or functions of embodiments of the current technology. Further, as used herein, "logic" may include hardware, software, firmware, or a combination of thereof.

The processor 2 communicates with a memory 15 where parameters are kept ready for use by the processor 2, and where the images being processed by the processor 2 can be stored if the user desires. The one or more memories 15 may comprise a selection of a hard disk drive, a floppy disk drive, a magnetic tape drive, an optical disk drive, a CD or DVD drive (R or RW), or other removable or fixed media drive.

Method Embodiments

Figure 2:
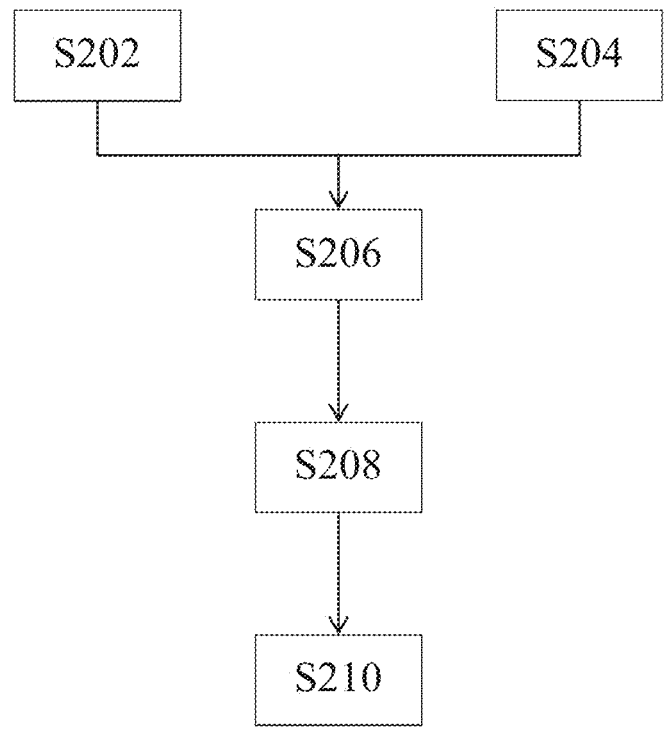
FIG. 2 is a block diagram of a method according to one or more embodiments.

FIG. 2 shows a block diagram of a method according to one or more embodiments. According to an embodiment, a method for facilitating or enabling improved analysis and interpretation of associated infrared (IR) and visible light (VL) image data in an IR image and a VL image depicting a real world scene is provided. Thereby, improved usability is further obtained. According to an embodiment, the associated VL and IR image information are represented as an image pair comprising an infrared (IR) image and a visible light (VL) image depicting the same real world scene. According to an embodiment, said images are captured using a thermography arrangement comprising an IR imaging system and a VL imaging system.

According to one or more embodiments, the method comprises:

Step S202: Capturing an IR image depicting the real world scene using the IR imaging system, having a first field of view.

Step S204: Capturing a visible light image depicting the real world scene using the visible light imaging system, having a second field of view.

According to one or more embodiments, steps S202 and S204 may be performed simultaneously, in close succession or at time instances further apart. Since it is preferable that the depicted scene has changed as little as possible between capture of the respective images, it is advantageous to capture the IR and VL image simultaneously or in close succession. However, in a monitoring situation where the thermography arrangement is e.g. fixedly mounted or placed on a stand for monitoring of a fairly static scene over a longer period of time, also images captured at time instances further apart may comprise representations wherein the depicted scene has stayed more or less the same and therefore provide accurate comparison results.

Step S206: Processing at least one of the VL image and the IR image such that the field of view represented in the visible light image substantially corresponds to the field of view represented in the IR image, thereby generating a resulting IR image and a resulting VL image with corresponding fields of view.

The IR image and the VL image are herein referred to as resulting images after step S206 has been performed, even for the embodiments where one of the IR image and VL image has not been processed in step S206.

According to embodiments, the processing may comprise a selection of cropping; windowing; zooming; shifting; and rotation, according to methods known in the art. For instance, a portion of the VL image may be shifted and/or cropped or windowed to match the IR FOV.

Furthermore, since the resolution of the VL sensor and/or IR sensor, in terms of the number of sensor elements, does not necessarily match the resolution of the display onto which the captured images are to be displayed, the VL image and/or IR image may further be scaled to match the resolution of the display.

According to an embodiment, the captured IR image represents a wider FOV than that of the VL image, i.e. the IR imaging system FOV entirely comprising the VL imaging system FOV. Hence, the VL image is processed such that the FOV of the VL image matches the FOV of the IR image.

According to another embodiment, the captured VL image represents a wider FOV than that of the IR image, i.e. the IR imaging system FOV entirely comprising the VL imaging system FOV . . . . Hence, the IR image is processed such that the FOV of the IR image matches the FOV of the VL image.

According to a third embodiment, both the FOV of the VL imaging system and the FOV of the IR imaging system and the images representing the respective FOV may have any internal relationship and both images are processed such that the represented FOVs of the images match each other and a third, narrower, FOV. This may for example be relevant if the FOVs of the IR and VL imaging systems do not completely overlap, meaning that parts of images captured by both imaging systems must be removed in order for the FOVs represented in the images to match.

According to an embodiment, the processing of step S206 comprises identifying an area or a region in the captured image, representing the wider FOV, that corresponds to the narrower FOV represented by the other captured image. Expressed in another way, the processing comprises identifying the area or region in the image representing the wider FOV that depicts the same part of the observed scene as the image representing the narrower FOV.

The area or region may according to an embodiment be identified using a known relationship between the imaging systems 11, 12, such as known parallax, pointing error and/or the relationship between the FOV of the IR imaging system 12 and the VL imaging system 11. Said relationships may have been determined during design, production or calibration of the thermography arrangement, in manners known per se (e.g., conventional methods as would be understood by one skilled in the art). According to another embodiment, the area or region may be identified for each image pair using any known identification method, e.g. pattern recognition, edge detection, object recognition and/or cross-correlation techniques, just to mention a few.

According to an embodiment, the processing of steps S206 may further comprise alignment and/or stabilization of the captured images, in manners known per se, in order to provide a more accurate identification of the area or region as described above.

Because the two images are matched after step S206, a user can easily identify points-of-interest in the IR image with areas or objects in the VL image simply by noting where in the IR image the feature of interest is located and look at the same coordinates in the VL image.

Once it has been ensured that the FOV of the IR image and the FOV of the VL image correspond to each other the method may further comprise, according to embodiments, resampling the processed visible light image such that the resolution of the processed visible light image matches the resolution of the IR image and/or scaling the processed visible light image such that the size of the processed visible light image matches the size of the IR image. Resampling and/or scaling may be performed if the images after the processing in step S206 do not already have the same resolution or size.

Step S208: After the processing, associating the resulting IR and visible light images.

According to an embodiment, associating the images comprises creating a relation or connection between the images, thereby creating an image pair. The associated images may then be handled or processed simultaneously. For instance, both images may be displayed next to each other, or a user viewing the associated images may be enabled to switch between display modes of the images.

According to an embodiment, associating the images comprises creating an instance of a data structure comprising the two images.

According to an embodiment, the associated images may further be stored, either stored temporarily on a transitory memory, e.g. for live or real-time viewing of the captured images at site, or stored more permanently on a non-transitory memory for later viewing and analysis, using a display 3 of the thermography arrangement 1 or a display 7 of an external unit 10.

According to an embodiment, the associated images are stored on a volatile memory that is either integrated in the thermography arrangement or coupled to the thermography arrangement. The volatile memory may e.g. be a RAM or a cache storage. According to another embodiment, the associated images are stored on a non-volatile memory that is integrated in the thermography arrangement; coupled to the thermography arrangement; or integrated in an external unit configured to receive data from, and/or transfer data to, the thermography arrangement.

Step S210: Enable a user to access the associated images for display, wherein analysis and interpretation of the image pair content is intuitive as the visible light image and the IR image are representations of the same real world scene according to the same field of view.

According to an embodiment, enabling a user to access the associated images for display comprises communicating data comprising the associated images to an external unit 10 via a data communication interface 5, 6. The external unit 10 may comprise a display 7 configured to display the received image data.

According to an embodiment, enabling the user to access the associated images for display comprises displaying the associated images on a display integrated in or coupled to the thermography arrangement. According to an embodiment, the associated images are displayed in real-time or near real-time, in connection to being captured.

According to an embodiment, enabling the user to access the associated images for display further comprises enabling switching between displaying the VL image and the IR image.

According to an embodiment, enabling the user to access the associated images for display further comprises enabling display of a combined image dependent on the associated images.

According to an embodiment, the combined image is a contrast enhanced version of the IR image with addition of VL image data.

Figure 4:
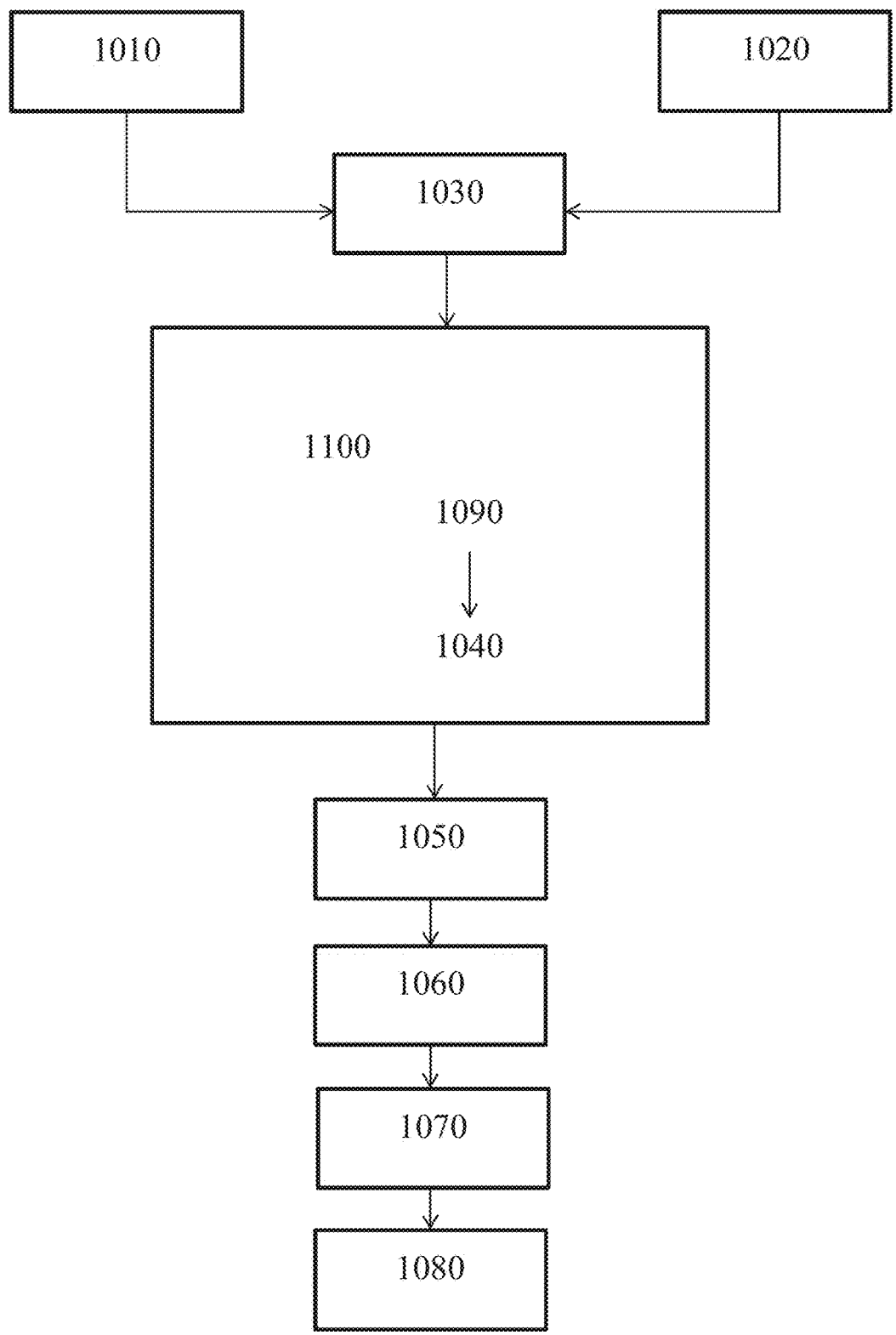
FIG. 4 shows a method for obtaining a combined image comprising the steps of aligning, determining that the VL image resolution value and the IR image resolution value are substantially the same and combining the IR image and the VL image.

According to an embodiment, a method for obtaining a combined image comprises the steps of aligning, determining that the VL image resolution value and the IR image resolution value are substantially the same and combining the IR image and the VL image. A schematic view of the method is shown in FIG. 4.

Aligning

Since the capturing of the infrared (IR) image and capturing of the visual light (VL) image is generally performed by different imaging systems of the imaging device mounted in a way that the offset, direction and rotation around the optical axes differ. The optical axes between the imaging systems may be at a distance from each other and an optical phenomenon known as parallax distance error will arise. The optical axes between the imaging systems may be oriented at an angle in relation to each other and an optical phenomenon known as parallax pointing error will arise. The rotation of the imaging systems around their corresponding optical axes and an optical phenomenon known as parallax rotation error will arise. Due to these parallax errors the captured view of the real world scene, called field of view (FOV) might differ between the IR imaging system and the VL imaging system.

Since the capturing of the infrared (IR) image and capturing of the visual light (VL) image is generally performed by different imaging systems of the imaging device with different optical systems with different properties, such as magnification, the captured view of the real world scene, called field of view (FOV) might differ between the imaging systems. The IR image and the VL image might be obtained with different optical systems with different optical properties, such as magnification, resulting in different sizes of the FOV captured by the IR sensor and the VL sensor.

In order to combine the captured IR and captured VL image the images must be adapted so that an adapted IR image and adapted VL image representing the same part of the observed real world scene is obtained, in other words compensating for the different parallax errors and FOV size. This processing step is referred to as registration of or alignment of the IR image and the VL image.

Registration or alignment can be performed according to any method known to a skilled person in the art.

Determining that the VL Image Resolution Value and the IR Image Resolution Value are Substantially the Same In an embodiment the IR image and the VL image might be obtained with different resolution, i.e. different number of sensor elements of the imaging systems. In order to enable pixel wise operation on the IR and VL image they need to be re-sampled to a common resolution. Re-sampling can be performed according to any method known to a skilled person in the art.

In an embodiment the IR image is resampled to a first resolution and the VL image are resampled to a second resolution, wherein the first resolution is a multiple of 2 times the second resolution or the second resolution is a multiple of 2 times the first resolution, thereby enabling instant resampling by considering every $2^N$ pixels of the IR image or the VL image.

Combining IR Image and VL Image

In one or more embodiments an IR image and a VL image is combined by combining an aligned IR image with high spatial frequency content of an aligned VL image to yield a contrast enhanced combined image. The combination is performed through superimposition of the high spatial frequency content of the VL image and the IR image, or alternatively superimposing the IR image on the high spatial frequency content of the VL image. As a result, contrasts from the VL image can be inserted into an IR image showing temperature variations, thereby combining the advantages of the two image types without losing clarity and interpretability of the resulting combined image.

According to an embodiment, a method for obtaining a contrast enhanced combined image comprises the following steps:

Step 1010 Capturing VL Image.

In an exemplary embodiment, capturing a VL image comprises capturing a VL image depicting the observed real world scene using the VL imaging system with an optical system and sensor elements, wherein the captured VL image comprises VL pixels of a visual representation of captured visual light image. Capturing a VL image can be performed according to any method known to a skilled person in the art.

Step 1020 Capturing an IR Image

In an exemplary embodiment, capturing an IR image comprises capturing an IR image depicting an observed real world scene using the IR imaging system with an optical system and sensor elements, wherein the captured IR image comprises captured infrared data values of IR radiation emitted from the observed real world scene and associated IR pixels of a visual representation representing temperature values of the captured infrared data values. Capturing an IR image can be performed according to any method known to a skilled person in the art.

In an exemplary embodiment, steps 1010 and 1020 are performed simultaneously or one after the other.

In an exemplary embodiment, the images may be captured at the same time or with as little time difference as possible, since this will decrease the risk for alignment differences due to movements of an imaging device unit capturing the visual and IR images. As is readily apparent to a person skilled in the art, images captured at time instances further apart may also be used.

In an exemplary embodiment, the sensor elements of the IR imaging system and the sensor elements of the VL image system are substantially the same, e.g. have substantially the same resolution.

In an exemplary embodiment, the IR image may be captured with a very low resolution IR imaging device, the resolution for instance being as low as 64×64 or 32×32 pixels, but many other resolutions are equally applicable, as is readably understood by a person skilled in the art. The inventor has found that if edge and contour (high spatial frequency) information is added to the combined image from the VL image, the use of a very low resolution IR image will still render a combined image where the user can clearly distinguish the depicted objects and the temperature or other IR information related to them Capturing an IR image can be performed according to any method known to a skilled person in the art.

Step 1030 Aligning the IR Image and the VL Image.

In an exemplary embodiment, parallax error comprises parallax distance error between the optical axes that generally arises due to differences in placement of the sensors of the imaging systems for capturing said IR image and said VL image, the parallax pointing error angle created between these axes due to mechanical tolerances that generally prevents them being mounted exactly parallel and the parallax rotation error due to mechanical tolerances that generally prevents them being mounted exactly with the same rotation around the optical axis of the IR and VL image systems.

In an exemplary embodiment, the capturing of the infrared (IR) image and capturing of the visual light (VL) image is performed by different imaging systems of the imaging device with different optical systems with different properties, such as magnification, the extent of the captured view of the real world scene, called size of field of view (FOV) might differ.

Aligning the IR image by compensating for parallax error and size of FOV to obtain an aligned IR image and an aligned VL image with substantially the same FOV can be performed according to any method known to a skilled person in the art.

Step 1090 determining a resolution value of the IR imaging system and a resolution value of VL imaging system, wherein the resolution value of the IR imaging system corresponds to the resolution of the captured IR image and the resolution value of VL imaging system corresponds to the resolution of the captured VL image.

In one exemplary embodiment, the resolution value represents the number of pixels in a row and the number of pixels in a column of a captured image.

In one exemplary embodiment, the resolutions of the imaging systems are predetermined.

Determining a resolution value of the IR imaging system and a resolution value of VL imaging system, wherein the resolution value of the IR imaging system corresponds to the resolution of the captured IR image and the resolution value of VL imaging system corresponds to the resolution of the captured VL image can be performed according to any method known to a skilled person in the art.

Step 1100 Determining that the VL Image Resolution Value and the IR Image Resolution Value are Substantially the Same If in Step 1100 it is determined that the VL image resolution value and the IR image resolution value are not substantially the same the method may further involves the optional step 1040 of re-sampling at least one of the received images so that the resulting VL image resolution value and the resulting IR image resolution value, obtained after re-sampling, are substantially the same.

In one exemplary embodiment, re-sampling comprises up-sampling of the resolution of the IR image to the resolution of the VL image, determined in step 1090.

In one exemplary embodiment, re-sampling comprises up-sampling of the resolution of the VL image to the resolution of the IR image, determined in step 1090.

In one exemplary embodiment, re-sampling comprises down-sampling of the resolution of the IR image to the resolution of the VL image, determined in step 1090.

In one exemplary embodiment, re-sampling comprises down-sampling of the resolution of the VL image to the resolution of the IR image, determined in step 1090.

In one exemplary embodiment, re-sampling comprises re-sampling of the resolution of the IR image and the resolution of the VL image to an intermediate resolution different from the captured IR image resolution and the captured VL image resolution determined in step 1090.

In one exemplary embodiment, the intermediate resolution is determined based on the resolution of a display unit of the thermography arrangement or imaging device.

According to an exemplary embodiment, the method steps are performed for a portion of the IR image and a corresponding portion of the VL image. According to an embodiment, the corresponding portion of the VL image is the portion that depicts the same part of the observed real world scene as the portion of the IR image. In this embodiment, high spatial frequency content is extracted from the portion of the VL image, and the portion of the IR image is combined with the extracted high spatial frequency content of the portion of the VL image, to generate a combined image, wherein the contrast and/or resolution in the portion of the IR image is increased compared to the contrast of the originally captured IR image.

According to different embodiments, said portion of the IR image may be the entire IR image or a sub portion of the entire IR image and said corresponding portion of the VL image may be the entire VL image or a sub portion of the entire VL image. In other words, according to an embodiment the portions are the entire IR image and a corresponding portion of the VL image that may be the entire VL image or a subpart of the VL image if the respective IR and visual imaging systems have different fields of view.

Determining that the VL image resolution value and the IR image resolution value are substantially the same can be performed according to any method known to a skilled person in the art.

Step 1050 Process the VL Image by Extracting the High Spatial Frequency Content of the VL Image According to an exemplary embodiment, extracting the high spatial frequency content of the VL image is performed by high pass filtering the VL image using a spatial filter.

According to an exemplary embodiment, extracting the high spatial frequency content of the VL image is performed by extracting the difference (commonly referred to as a difference image) between two images depicting the same scene, where a first image is captured at one time instance and a second image is captured at a second time instance, preferably close in time to the first time instance. The two images may typically be two consecutive image frames in an image frame sequence. High spatial frequency content, representing edges and contours of the objects in the scene, will appear in the difference image unless the imaged scene is perfectly unchanged from the first time instance to the second, and the imaging sensor has been kept perfectly still. The scene may for example have changed from one frame to the next due to changes in light in the imaged scene or movements of depicted objects. Also, in almost every case the imaging device or thermography system will not have been kept perfectly still.

A high pass filtering is performed for the purpose of extracting high spatial frequency content in the image, in other words locating contrast areas, i.e. areas where values of adjacent pixels display large differences, such as sharp edges. A resulting high pass filtered image can be achieved by subtracting a low pass filtered image from the original image, calculated pixel by pixel.

Processing the VL image by extracting the high spatial frequency content of the VL image can be performed according to any method known to a skilled person in the art (Optional) Step 1060 Process the IR Image to Reduce Noise in and/or Blur the IR Image According to an exemplary embodiment, processing the IR image comprises reducing noise and/or blur the IR image is performed through the use of a spatial low pass filter. Low pass filtering may be performed by placing a spatial core over each pixel of the image and calculating a new value for said pixel by using values in adjacent pixels and coefficients of said spatial core.

The purpose of the low pass filtering performed at optional step 1060 is to smooth out unevenness in the IR image from noise present in the original IR image captured at step 1020. Since sharp edges and noise visible in the original IR image are removed or at least diminished in the filtering process, the visibility in the resulting image is further improved through the filtering of the IR image and the risk of double edges showing up in a combined image where the IR image and the VL image are not aligned is reduced.

Processing the IR image to reduce noise in and/or blur the IR image can be performed according to any method known to a skilled person in the art.

Step 1070 Combining the Extracted High Spatial Frequency Content of the Captured VL Image and the Optionally Processed IR Image to a Combined Image In one exemplary embodiment, combining the extracted high spatial frequency content of the captured VL image and the optionally processed IR image to a combined image comprises using only the luminance component Y from the processed VL image.

In one exemplary embodiment, combining the extracted high spatial frequency content of the captured VL image and the optionally processed IR image to a combined image comprises combining the luminance component of the extracted high spatial frequency content of the captured VL image with the luminance component of the optionally processed IR image. As a result, the colors or greyscale of the IR image are not altered and the properties of the original IR palette maintained, while at the same time adding the desired contrasts to the combined image. To maintain the IR palette through all stages of processing and display is beneficial, since the radiometry or other relevant IR information may be kept throughout the process and the interpretation of the combined image may thereby be facilitated for the user.

In one exemplary embodiment, combining the extracted high spatial frequency content of the captured VL image and the optionally processed IR image to a combined image comprises combining the luminance component of the VL image with the luminance component of the IR image using a factor alpha to determine the balance between the luminance components of the two images when adding the luminance components. This factor alpha can be determined by the imaging device or imaging system itself, using suitable parameters for determining the level of contour needed from the VL image to create a satisfactory image, but can also be decided by a user by giving an input to the imaging device or imaging system. The factor can also be altered at a later stage, such as when images are stored in the system or in a PC or the like and can be adjusted to suit any demands from the user.

In one exemplary embodiment, combining the extracted high spatial frequency content of the captured VL image and the optionally processed IR image to a combined image comprises using a palette to map colors to the temperature values of the IR image, for instance according to the YCbCr family of color spaces, where the Y component (i.e. the palette luminance component) may be chosen as a constant over the entire palette. In one example, the Y component may be selected to be 0.5 times the maximum luminance of the combined image, the VL image or the IR image. As a result, when combining the IR image according to the chosen palette with the VL image, the Y component of the processed VL image can be added to the processed IR image 305 and yield the desired contrast without the colors of the processed IR image being altered. The significance of a particular nuance of color is thereby maintained during the processing of the original IR image.

When calculating the color components, the following equations can be used to determine the components Y, Cr and Cb for the combined image with the Y component from the processed, e.g. high pass filtered, VL image and the Cr and Cb components from the IR image hp_y_vis=highpass(y_vis)
(y_ir, cr_ir, cb_ir)=colored(lowpass(ir_signal_linear))
which in another notation would be written as:
$hp_{y_{vis}}$=highpass($y_{vis}$)
($y_{ir}$, $cr_{ir}$, $cb_{ir}$)=colored(lowpass($ir_{signal\ linear}$))

Other color spaces than YCbCr can, of course, also be used with embodiments of the present disclosure. The use of different color spaces, such as RGB, YCbCr, HSV, CIE 1931 XYZ or CIELab for instance, as well as transformation between color spaces is well known to a person skilled in the art. For instance, when using the RGB color model, the luminance can be calculated as the mean of all color components, and by transforming equations calculating a luminance from one color space to another, a new expression for determining a luminance will be determined for each color space.

Step 1080 Adding High Resolution Noise to the Combined Image.

According to an exemplary embodiment, the high resolution noise is high resolution temporal noise.

High resolution noise may be added to the combined image in order to render the resulting image more clearly to the viewer and to decrease the impression of smudges or the like that may be present due to noise in the original IR image that has been preserved during the optional low pass filtering of said IR image.

According to an embodiment, the processor 2 is arranged to perform the method steps 1010-1080

There may be provided a user interface enabling the user to interact with the displayed data, e.g. on one of the displays 3, 7. Such a user interface may comprise selectable options or input possibilities allowing a user to switch between different views, zoom in on areas of interest etc. In order to interact with the display, the user may provide input using one or more of the input devices 4.

According to an embodiment, a user may interact with the thermography arrangement 1 to perform zooming or scaling of one of the images, in manners known in the art, before storing or display of the images. If a user performs a zooming or scaling action on either the IR or the VL image, the FOV of the associated image will be adjusted according to any of the method embodiments described herein (e.g., for step S208 and S210). Thereby, the FOV of the associated images will always be matched, either in real-time or near real-time to a user viewing the images on site, or in image data stored for later retrieval.

Figure 3A:
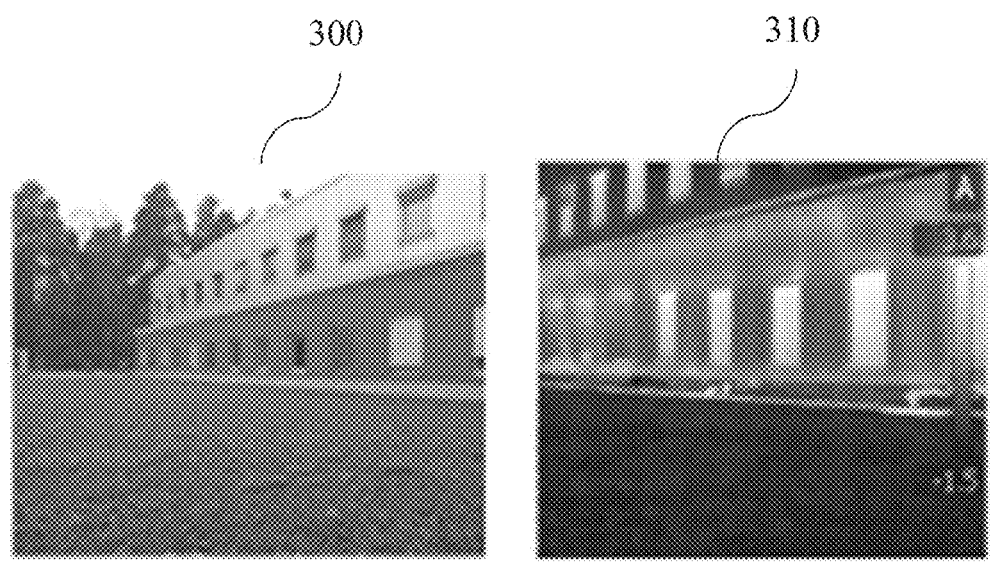
FIG. 3a shows an example of an image pair according to an embodiment, without use of the inventive method.
Figure 3B:
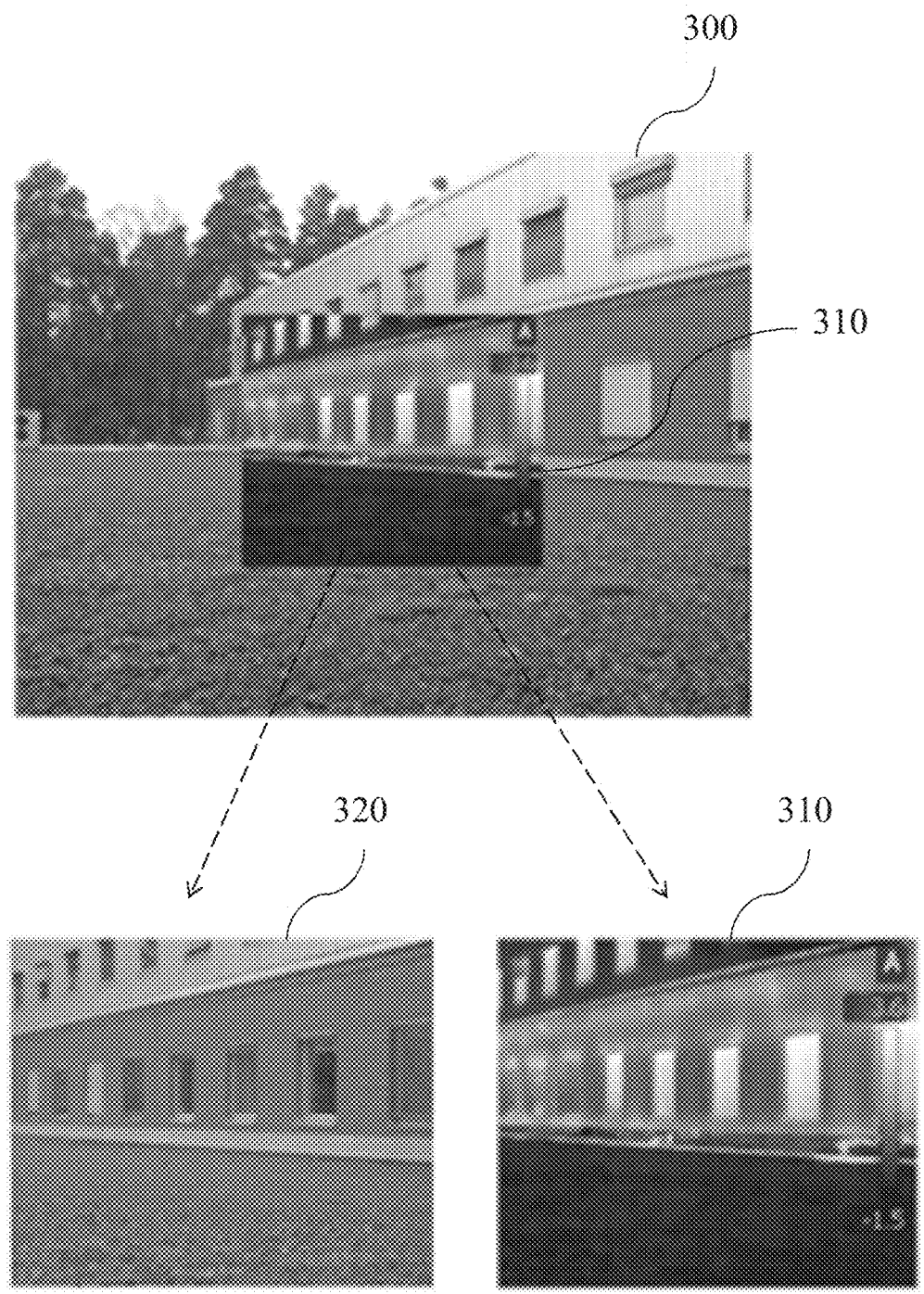
FIG. 3b shows an example of an image pair according to an embodiment.

FIG. 3a shows an example of an image pair according to an embodiment, without use of the inventive method. The image pair shown in FIG. 3A comprises a VL image 300, according to a first FOV, and an IR image, according to a second FOV. According to the embodiments shown in FIG. 3A, the FOV of the VL image 300 corresponds to the FOV of the VL imaging system 11 and the FOV of the IR image 310 corresponds to the FOV of the IR imaging system 12.

As is readily apparent to a person skilled in the art, further processing of the associated and processed image pair, according to methods known in the art, may be performed.

Use Case Embodiments

According to an embodiment, the "FOV follow" functionality or in other words matching of the FOV of IR images with the FOV of corresponding VL images is a mode that may be turned on and off. Turning the FOV follow mode on and off may be performed automatically, based on settings of the thermography arrangement, or manually by a user interacting with one or more of the input devices 4.

In a use case embodiment, a user may be operating a thermography arrangement to investigate a scene looking for abnormalities, for example in the form of moist, poor isolation or overheated electronics at a construction site. According to this example, the user may view the captured IR and VL image frame sequences in real-time, or near real-time, on a display of the thermography arrangement. According to an embodiment, the IR image frame sequence is displayed to the user on the display. When the user sees something of interest, for example a hot spot that may indicate e.g. malfunctioning electronics, the user may switch from the IR image view to the VL image view, using an input device provided on the camera. According to embodiments of the invention described above, the user will now be presented with a VL image according to the same FOV as the IR image that was presented a moment ago. Because the two images are matched, the user can easily identify points-of-interest in the IR image with areas or objects in the VL image simply by noting where in the IR image the feature of interest is located and look at the same coordinates in the VL image. In other words, the relevant part of the scene will be right where the user a moment ago noticed the area of interest in the IR image.

As is readily apparent to a person skilled in the art, display of pure IR or pure VL images are not the only options. For instance, fusion, blending or picture in picture may be used according to circumstances. According to an embodiment, the IR image displayed may instead of a pure IR image be a fused, blended or contrast enhanced version of the IR image, with addition of VL image data, generated in manners known in the art. However, an IR image is often hard to interpret in itself and also in blended or fused images it may be hard to relate the image content to the observed scene. Therefore, the possibility to switch to a VL representation wherein the FOV of the VL image coincides with the FOV of the previously displayed IR or combined image is very advantageous for interpretation.

According to a use case embodiment, the user is using the thermography arrangement to observe a scene distant from the point where the user is standing. Therefore, the user chooses to zoom in, while being shown an IR image on the display of the thermography arrangement. When the user has zoomed in on the object or region of interest, the user switches to VL in order to relate the IR related data to the scene. If the FOV follow mode is turned on, the user will now see a VL image representing the zoomed in FOV of the IR image that was shown a moment ago. If the FOV follow mode is turned off, the IR imaging system and the VL imaging system work independently, during capturing of a live image sequence or still pictures, and the user may for example zoom in in the images captured by one of the IR or VL imaging system without affecting the image or image sequence captured by the other imaging system. In other words, the user will be presented with either a zoomed in version of the VL image according to the VL imaging systems FOV, which is zoomed in but not matched with the IR image, or with the original zoomed-out VL image according to the entire FOV of the VL imaging system. According to a use case embodiment, the user has the FOV follow mode on, switches to VL to see in what part of the scene the interesting feature is found in the zoomed-in and matched VL image, and then turns the FOV follow mode off whereby a VL image according to the full FOV of the VL imaging system is displayed, thereby allowing the user to put the interesting part of the scene into its context.

According to an embodiment, the user may use an input device 4 to capture and/or store an associated IR image and VL image pair. In the eyes of the user, a single input action may thereby be performed. In response to the single user action, method steps according to any of the embodiments described herein are performed, leading to capturing, association, storing and/or displaying of images dependent on the preset or user selected settings of the thermography arrangement currently in operation.

If the user is using the thermography arrangement to observe a distant object, the user may want to zoom in and take a picture or capture an image sequence. The user may have detected the object or detail of interest in the IR image, but finds that it is easier to zoom in in the VL view. Therefore the user switches to VL before zooming. Using one or more embodiments of the inventive method, the FOV of the VL image correspond to the FOV of the IR image, making it easy for the user to relate the detected temperature pattern or abnormality of interest seen in the IR image to the correct part of the VL scene and zoom in on it.

In another example, the user may want to zoom out in order to put an observed detail or object into its context. If the user switches between IR and VL in connection with the zooming actions, the FOVs will always be matched. In case the user manually selects a FOV for VL that is wider than what is obtainable for the IR imaging system, the FOV of the IR imaging system will be set to its maximum.

According to an embodiment, what is shown on the display is what is saved when the user saves the image. If the FOV follow mode is on, an image pair comprising an IR and a VL image is stored, wherein the images have a matched FOV. The user may at a later time retrieve the image pair and view them on a display of the thermography arrangement or an external unit. According to the settings of the display and the user interface used, the user may view the image pair either simultaneously, the images being presented next to each other, or one by one, where the user is enabled to switch between the images.

According to another use case, a user has captured images and chooses to generate a report, using report generating logic integrated in the thermography arrangement or in an external unit to which the captured image data has been transferred. In this case, a user often wishes to include an image pair comprising an IR image and a VL image depicting the same scene. However, in the prior art the user would either have to include an IR image and a VL image representing different FOVs, or perform an additional step of e.g. manually cropping the image having a wider FOV to match the FOV of the other image, in order to facilitate interpretation for a person reading the report. According to the method embodiments described herein, this is not necessary, as the associated images will always represent the same FOV, thereby enabling improved analysis and interpretation of associated visible light and IR image information.

Further Embodiments

As is readily apparent to a person skilled in the art, the captured and associated images may be further processed according to methods known in the art, e.g. to obtain images that are fused, blended or presented as picture in picture.

According to an embodiment, the processor is configurable using a hardware description language (HDL). According to an embodiment, the processor 2 is a Field-programmable gate array (FPGA) or other type of logic device.

According to an embodiment, the processor 2 is further adapted to perform any of the steps or functions of the method embodiments described herein.

According to an embodiment of the invention, there is provided a computer system having a processor being adapted to perform any of the steps or functions of the method embodiments described herein.

According to an embodiment of the invention, there is provided a computer-readable medium on which is stored non-transitory information adapted to control a processor to perform any of the steps or functions of the method embodiments described herein.

According to an embodiment of the invention, there is provided a computer program product comprising code portions adapted to control a processor to perform any of the steps or functions of the method embodiments described herein.

According to an embodiment of the invention, there is provided a computer program product comprising configuration data adapted to configure a Field-programmable gate array (FPGA) to perform any of the steps or functions of the method embodiments described herein.

Further Advantages of the Invention

By activating the FOV follow functionality the user is enabled to instantly switch between image information, such as the VL image, the IR image or a combined image, thereby instantly accessing the most relevant information for the current scenario.

By activating the FOV follow functionality the quality and the interpretability of combined images, such as fused or blended images, are substantially improved as objects in the VL image and in the IR image substantially overlap.

By enabling the user to select the mode of the FOV functionality can be adapted to the relevant user scenario, thereby greatly enhancing the user experience.

Embodiments set forth herein may be used in accordance with any of the various processing techniques and/or physical implementations set forth in U.S. patent application Ser. No. 13/437,645 filed Apr. 2, 2012 and entitled "INFRARED RESOLUTION AND CONTRAST ENHANCEMENT WITH FUSION", U.S. patent application Ser. No. 14/138,040 filed Dec. 21, 2013 and entitled "TIME SPACED INFRARED IMAGE ENHANCEMENT", U.S. patent application Ser. No. 14/138,052 filed Dec. 21, 2013 and entitled "INFRARED IMAGING ENHANCEMENT WITH FUSION", and U.S. patent application Ser. No. 14/138,058 filed Dec. 21, 2013 and entitled "COMPACT MULTI-SPECTRUM IMAGING WITH FUSION", all of which are hereby incorporated by reference in their entirety.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A method for enabling improved analysis and interpretation of associated infrared (IR) and visible light (VL) image data in an IR image and a VL image depicting a same scene, said IR image and VL image being captured using a thermography arrangement comprising an IR imaging system and a VL imaging system, the method comprising:
   capturing an IR image depicting the scene using the IR imaging system, having a first field of view;
   capturing a visible light image depicting the scene using the visible light imaging system, having a second field of view different from the first field of view;
   in response to activation of a field of view (FOV) follow control, wherein the FOV follow control is selectable by a user to activate or deactivate a FOV follow function for the IR and VL images, processing at least one of the VL image and the IR image, wherein the processing comprises a selection of cropping, windowing, zooming, shifting, and/or rotation such that the field of view represented in the VL image substantially corresponds to the field of view represented in the IR image, thereby generating a resulting IR image and a resulting VL image with the same field of view;
   storing in memory the resulting IR image and the resulting VL image as associated images with the same field of view; and
   enabling a user to access the associated images for display of a representation of said associated images, wherein the enabling comprises retrieving the associated images with the same field of view from the memory at a later time and displaying the associated images.

2. A method according to claim 1, wherein the enabling the user to access the associated images for display further comprises enabling display of a combined image dependent on the associated images, and wherein the displaying the associated images comprises displaying on a display integrated in or coupled to the thermography arrangement.

3. A method according to claim 2, wherein the method further comprises:
   aligning the IR image and the VL image;
   determining that a VL image resolution value and an IR image resolution value are substantially the same; and combining the IR image and the VL image to obtain the combined image.

4. A method according to claim 1, wherein the enabling the user to access the associated images for display further comprises: deactivating the FOV follow function to display a full FOV of the visual image to allow the user to put an interested part of the scene in context with the full FOV.

5. A method according to claim 1, wherein the processing further comprises determining a resolution value of the IR imaging system and a resolution value of VL imaging system, wherein the resolution value of the IR imaging system corresponds to the resolution of the captured IR image and the resolution value of VL imaging system corresponds to the resolution of the captured VL image.

6. A method according to claim 1, wherein the processing further comprises determining that a VL image resolution value and an IR image resolution value are substantially the same and determining the same field of view between the VL image and the IR image based on one or more of an outline of a predetermined feature, a laser projection, center portions of the VL and IR images, and/or a user indication.

7. A method according to claim 1, wherein the processing further comprises processing the VL image by extracting high spatial frequency content of the VL image.

8. A method according to claim 1, wherein the processing further comprises processing the IR image to reduce noise in and/or blur the IR image.

9. A method according to claim 3, further comprising adding high resolution noise to the combined image.

10. A method according to claim 7, wherein the processing further comprises combining the extracted high spatial frequency content of the captured VL image and the IR image to a combined image.

11. The method of claim 1, wherein the capturing of the IR image and the capturing of the VL image are performed simultaneously or in close succession, and wherein the VL image and the IR image with the same field of view are generated when the FOV follow function is activated by a user.

12. A thermography arrangement for enabling improved analysis and interpretation of associated infrared (IR) and visible light (VL) image data in an IR image and a VL image depicting a same scene, said arrangement comprising:
an IR imaging system configured to capture the IR image of the scene according to a first field of view;
a VL imaging system configured to capture the VL image of the scene according to a second field of view different from the first field of view;
a display;
a memory; and
a processor configured to:
process, in response to activation of a field of view (FOV) follow control, wherein the FOV follow control is selectable by a user to activate or deactivate a FOV follow function for the IR and VL images, at least one of the VL image and the IR image, wherein processing comprises a selection of cropping, windowing, zooming, shifting, and/or rotation such that the field of view represented in the VL image substantially corresponds to the field of view represented in the IR image, thereby generating a resulting IR image and a resulting VL image with the same field of view,
store in the memory the resulting IR image and the resulting VL image as associated images with the same field of view, and
enable a user to access at a later time the associated images stored in the memory for display of a representation of said associated images, wherein the enabling comprises displaying the associated images on the display.

13. The thermography arrangement of claim 12, wherein the display is further configured to display the associated IR and VL images adjacent to each other, and wherein said display is integrated in or coupled to the thermography arrangement.

14. The thermography arrangement of claim 12, further comprising an interface configured to enable a user to access and/or display the associated IR and VL images.

15. The thermography arrangement of claim 12, wherein the display is configured to display the associated images to the user for further analysis and interpretation.

16. The thermography arrangement of claim 12, wherein the memory is a volatile memory that is:
integrated in the thermography arrangement; or
coupled to the thermography arrangement.

17. The thermography arrangement of claim 12, wherein the memory is a non-volatile memory that is:
integrated in the thermography arrangement;
coupled to the thermography arrangement; or
integrated in an external unit configured to receive data from, and/or transfer data to, the thermography arrangement.

18. The thermography arrangement of claim 12, wherein said processor is further configured to perform scaling of the at least one processed image such that the size of the images becomes the same.

19. The thermography arrangement of claim 12, wherein said processor is further configured to perform resampling the VL image and/or IR image processed such that the resolution of the VL and IR images becomes the same.

20. A computer-readable medium on which is stored non-transitory information configured to control a processor to perform a method for enabling improved analysis and interpretation of associated infrared (IR) and visible light (VL) image data in an IR image and a VL image depicting a same scene, said IR image and VL image being captured using a thermography arrangement comprising an IR imaging system and a VL imaging system, the method comprising:
capturing an IR image depicting the scene using the IR imaging system, having a first field of view;
capturing a visible light image depicting the scene using the visible light imaging system, having a second field of view different from the first field of view;
in response to activation of a field of view (FOV) follow control, wherein the FOV follow control is selectable by a user to activate or deactivate a FOV follow function for the IR and VL images, processing at least one of the VL image and the IR image, wherein the processing comprises a selection of cropping, windowing, zooming, shifting, and/or rotation such that the field of view represented in the VL image substantially corresponds to the field of view represented in the IR image, thereby generating a resulting IR image and a resulting VL image with the same field of view;
storing in memory the resulting IR image and the resulting VL image as associated images with the same field of view; and
enabling a user to access the associated images for display of a representation of said associated images, wherein the enabling comprises retrieving the associated images with the same field of view from the memory at a later time and displaying the associated images on a display, wherein the display is integrated in or coupled to the thermography arrangement.

* * * * *